No. 838,374. PATENTED DEC. 11, 1906.
J. R. BOSTWICK.
CREAM SEPARATOR.
APPLICATION FILED MAY 16, 1906.

2 SHEETS—SHEET 1.

Attest:
A. M. Whitmore,
E. J. Geiger.

Inventor:
John R. Bostwick,
by E. B. Whitmore, Atty.

No. 838,374. PATENTED DEC. 11, 1906.
J. R. BOSTWICK.
CREAM SEPARATOR.
APPLICATION FILED MAY 16, 1906.
2 SHEETS—SHEET 2.
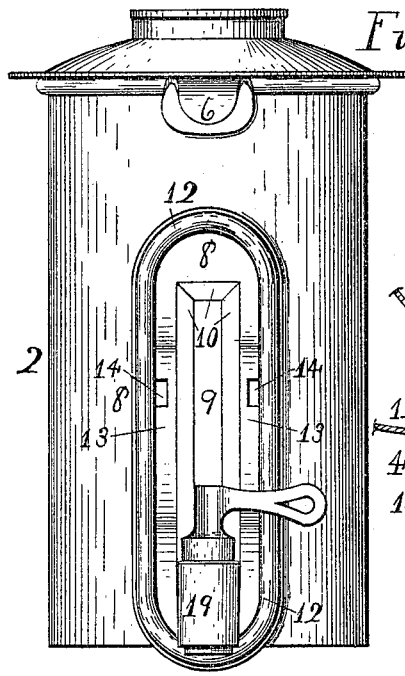
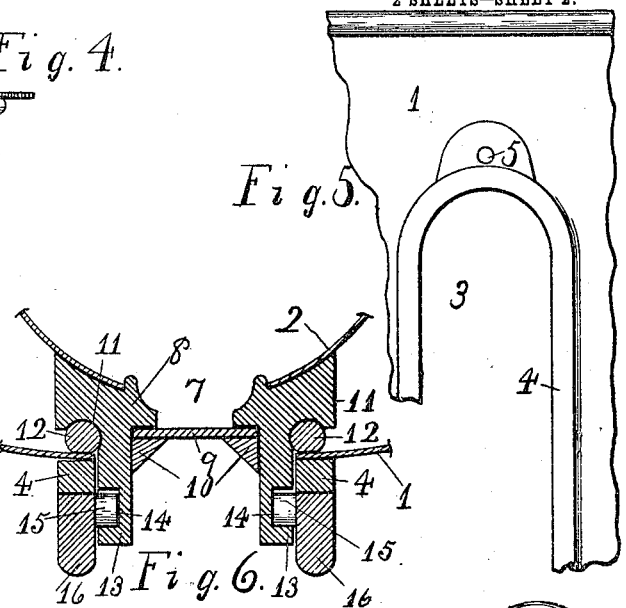
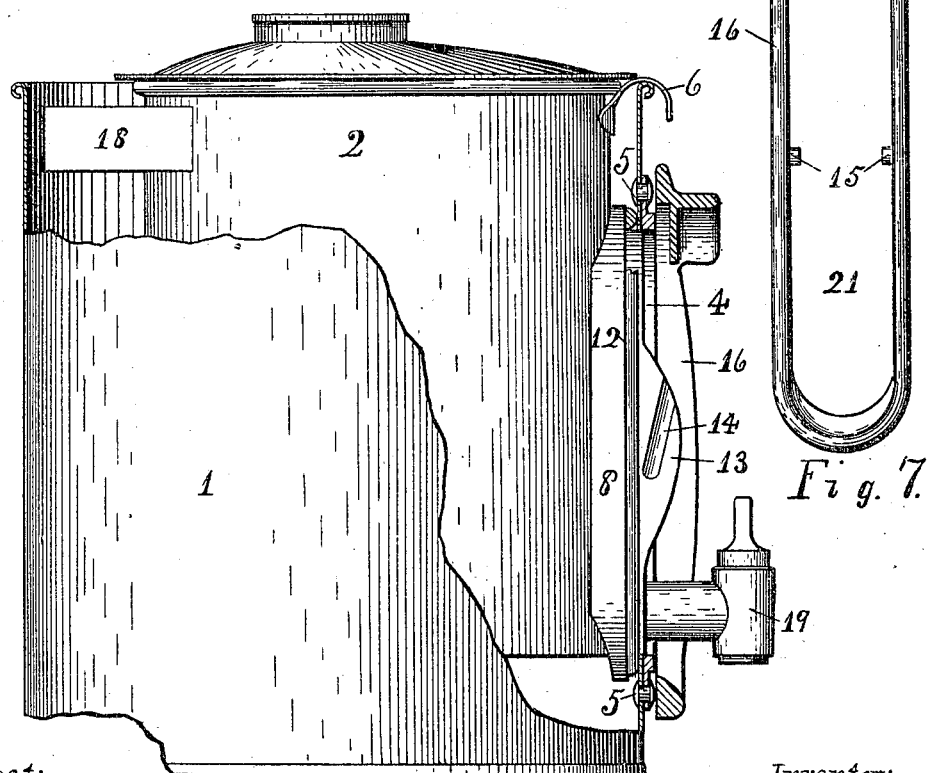
Attest:
A. M. Whitmore,
E. J. Geiger.
Inventor:
J. R. Bostwick,
by E. B. Whitmore, Atty.
THE NORRIS PETERS CO., WASHINGTON, D. C.

UNITED STATES PATENT OFFICE.

JOHN R. BOSTWICK, OF CLIFTON SPRINGS, NEW YORK, ASSIGNOR TO THE LAWRENCE-BOSTWICK MANUFACTURING COMPANY, OF PHELPS, NEW YORK.

CREAM-SEPARATOR.

No. 838,374.  Specification of Letters Patent.  Patented Dec. 11, 1906.

Application filed May 16, 1906. Serial No. 317,153.

*To all whom it may concern:*

Be it known that I, JOHN R. BOSTWICK, of Clifton Springs, in the county of Ontario and State of New York, have invented a new and useful Improvement in Cream-Separators, which improvement is fully set forth in the following specification and shown in the accompanying drawings.

This invention relates to certain new and useful improvements in vessels for holding milk and cream and commonly known as "cream-separators," there being one vessel or can within another and connected through an opening in the outer vessel.

The present invention has for its object, among others, to provide convenient, durable, and effective means for joining the two vessels and for locking them together.

Other objects and advantages of the invention will be brought out and made to appear in the following description and particularly pointed out in the appended claims, reference being had to the accompanying drawings, which, with the reference-numerals
25 marked thereon, form a part of this specification.

Figure 1:
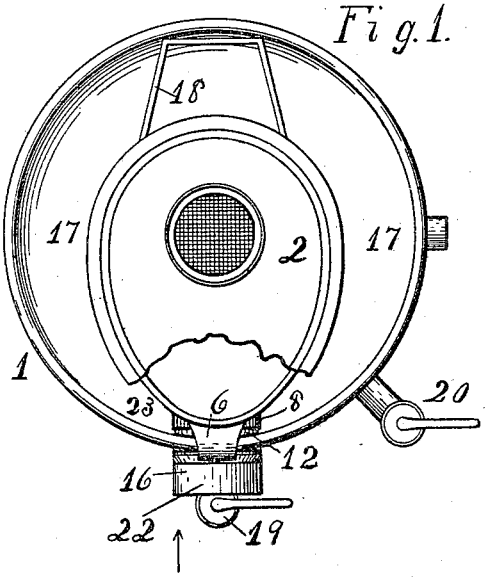
Figure 3:
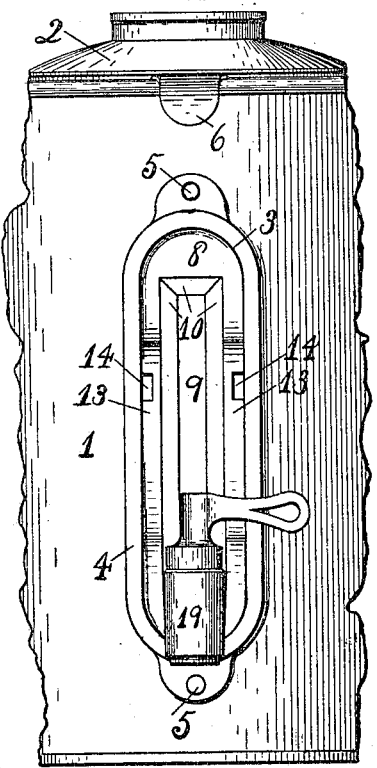
Figure 2:
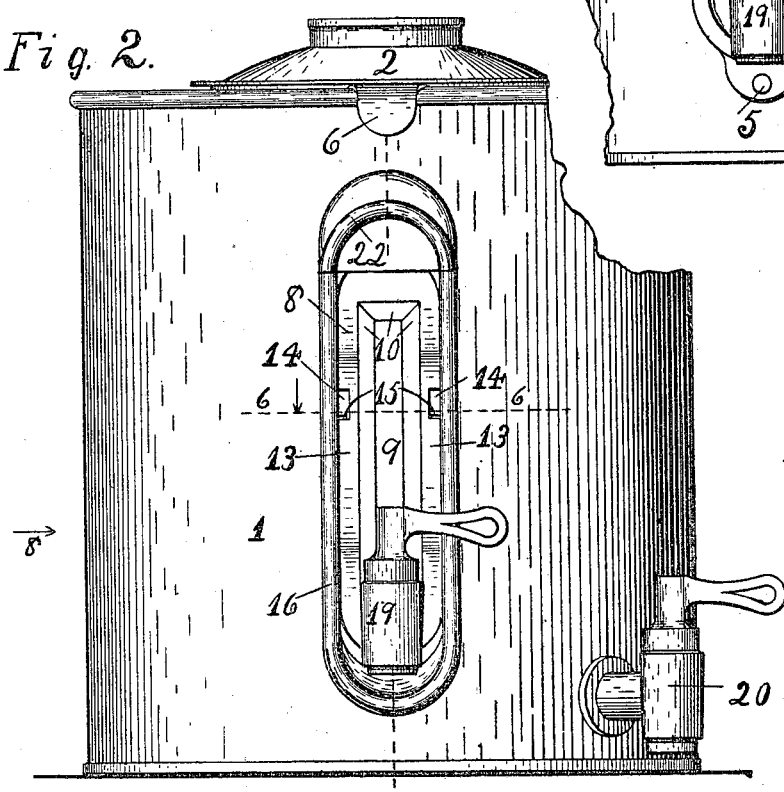

Figure 1 is a plan of the device with a part broken away. Fig. 2 is a front elevation seen as indicated by arrow in Fig. 1. Fig. 3 is a front elevation of parts at the middle of the device with the locking member removed. Fig. 4 is a front elevation of the inner vessel detached. Fig. 5 is a front elevation of a portion of the outer vessel, better showing the opening in the side thereof. Fig. 6 is a transverse section of the parts at the joining of the vessels, taken on the horizontal dotted line 6 6 in Fig. 2. Fig. 7 is a front elevation of the locking member detached. Fig. 8 is a side sectional elevation of the device seen as indicated by arrow 8 in Fig. 2, the section being on the central vertical dotted line in said Fig. 2.

Referring to the parts shown, 1 is the main vessel of the device, it being of sheet metal and cylindrical in form, 2, Figs. 1, 4, and 8, being the inner sheet-metal vessel, much smaller and ovoid in plan, as shown. The main vessel 1 is formed with a large vertical opening or slot 3, Fig. 5, surrounded by a thick metallic band or mouthpiece 4, Figs. 1, 3, 5, 6, and 8, held to place by simple fasteners 5 5. The inner vessel 2 is provided at the top with a forwardly-projecting hook 6, Figs. 1–4, and 8, in position to rest or catch upon the upper edge of the vessel 1 to aid in supporting the inner vessel in place in the outer vessel. The inner vessel is further formed with a vertical opening 7, Fig. 6, through its narrowest side and opposite the opening 3 in the vessel 1, surrounded by a stout metallic mouthpiece 8, Figs. 2, 3, 4, 6, and 8, projecting forward through the opening 3 of the vessel 1 and into the mouthpiece 4 of said opening 3.

The mouthpiece 8 holds a strip of glass 9 to close the opening 7 therein, secured in place by some simple means, as lines of putty 10, making a close joint, said mouthpiece being formed with a concave seat 11, Fig. 6, for receiving a band 12 of suitable packing material, as soft india-rubber, Figs. 4, 6, and 8. This band or cord of india-rubber is preferably circular in cross-section and serves to make a tight joint between the mouthpiece 8 and the adjacent inner face of the vessel 1 around the opening 3 to prevent the escape of water from the said vessel 1.

The mouthpiece 8 of the vessel 2 is formed with forward curved projections 13 13, Figs. 2, 3, 4, 6, and 8, formed upon their opposite outer vertical surfaces with similar downwardly-extending inclined slots or channels 14 14, in which to receive opposite inwardly-projecting short pins or studs 15 15 of a detachable locking member 16, Figs. 1, 2, 6, 7, and 8. The rear surface of the member 16 is plain and when in place bears directly against the forward vertical surface of the mouthpiece 4 of the vessel 1, as clearly appears in Figs. 6 and 8, the studs 15 15 occupying the respective channels 14 14 in the mouthpiece 8 of the inner vessel 2.

From this description of the parts it will be clearly understood that when the minor vessel 2 is in place in the main vessel 1, with its mouthpiece 8 reaching forward through the mouthpiece 4, and the locking member 16 is put to place and pressed downward the two vessels will be firmly locked or held together as if a single piece on account of the studs 15 15 firmly pressing the under inclined sides of the channels 14 14 in the mouthpiece 8, and when thus joined the narrow or small side of the vessel 2 is adjacent to the wall of the outer vessel, with a crescent-shape space 17, Figs. 1, 6, and 8, between them. Giving the minor vessel 2 the form shown in Fig. 1 and joining its narrow side to the outer vessel provides a large space 23 between the vessels where joined and rendering the space 17 for the water more nearly uniform in horizontal dimensions than if made in other form.

The inner vessel 2 is provided with a horizontal rearwardly-projecting spacer or reach 18, Figs. 1 and 8, to meet the opposing wall of the main vessel 1, as shown, serving to hold said vessel 2 forward in place when in the outer main vessel and also to prevent any lateral vibrations or shaking of the inner vessel. The vessel 2 is also provided with a discharge or outlet faucet 19, Figs. 1, 2, 3, 4, and 8, extending forward through the opening 3 in the vessel 1, the latter being also provided with a discharge-faucet 20.

The locking member or lock 16, Fig. 7, is formed with semicircular ends and parallel sides, the opening 21 through it being of sufficient size to permit it to be readily passed over and outside of the projections 13 13 of the mouthpiece 8 and also the outlet-faucet 19, as appears in Figs. 2 and 8. This lock 16 is formed near the top with a forwardly-projecting upwardly-curved finger-rest 22, Figs. 1, 2, 7, and 8, to facilitate in pulling the lock upward when it is wished to unlock the parts for the purpose of removing the inner vessel. This projection 22 also serves as a rest for the hand when pushing the lock firmly down to its place in the act of locking the parts.

What I claim as my invention, and desire to secure by Letters Patent, is—

1. A cream-separator consisting of a main vessel having an opening through its side, and a minor vessel within the main vessel with parts projecting through said opening in the main vessel, and a vertically-sliding locking-piece outside of the main vessel to engage said projecting parts of the inner vessel.

2. A cream-separator consisting of an outer cylindrical vessel with an opening through its vertical wall, and a smaller ovoid vessel within the outer vessel and having parts projecting through said opening in the outer vessel, and a vertically-sliding cam-locking member without the outer vessel to engage said projecting parts of the ovoid vessel, the narrow side of the ovoid vessel being adjacent to the side of the cylindrical vessel.

3. A cream-separator consisting of two vessels of unequal size the smaller vessel being within the larger vessel and removable therefrom, each vessel having an opening through its side, the smaller vessel having a mouthpiece projecting through the opening in the larger vessel, and a vertically-sliding cam-locking member without the larger vessel engaging the said mouthpiece to secure said two vessels together.

4. A device of the kind described consisting of two vessels one within the other, the outer vessel having an opening and the inner vessel having parts projecting through said opening and formed with inclined bearing-surfaces, and a locking member without the outer vessel, having elements to engage said respective inclined bearing-surfaces to hold the said vessels rigidly together.

5. A cream-separator having a main vessel formed with an opening and a minor vessel within the main vessel having parts projecting through said opening in the main vessel, and a locking member for the vessels without the main vessel and engaging said projecting parts of the minor vessel, said locking member having means engaging inclined ways on the projecting parts of the minor vessel, said member being adapted to have vertical motion upon its seat against the main vessel.

6. A cream-separator having a main vessel with a vertical elongated opening and a minor vessel within the main vessel and having parts projecting through said elongated opening, and an elongated locking member adapted to move in vertical directions upon a seat outside of the main vessel to engage said projecting parts of the minor vessel to lock the vessels together, said locking member having a finger-rest.

7. A device of the kind described, having a main vessel formed with a vertical elongated opening, and a minor vessel within the main vessel having a discharge-faucet projecting through the lower part of said opening, and other parts above the faucet projecting through the opening, and a locking member for said two vessels without the main vessel engaging said projecting parts above the faucet, said locking member being longer than wide, with rounded ends and large central opening to span said faucet and the said projecting parts of the inner vessel, with finger-rest above said central opening.

8. In a device of the character described, a main vessel having side opening with reinforced mouthpiece, a minor vessel of oval form within said inner vessel and having an opening in its narrowest side coincident with the opening in the main vessel, a mouthpiece surrounding said opening and extending through the opening in the main vessel and into its mouthpiece, an interposed packing between the main vessel and the mouthpiece of the minor vessel, the mouthpiece of the minor vessel having channels in the outer faces of its opposite sides, and a detachable locking member having studs engaged in said channels.

9. In a device of the character described, a main vessel having side opening with reinforced mouthpiece, a minor vessel of oval form within said inner vessel and having an opening in its narrowest side coincident with the opening in the main vessel, a mouthpiece surrounding said opening and extending through the opening in the main vessel and into its mouthpiece, an interposed packing between the main vessel and the mouthpiece of the minor vessel, the mouthpiece of the minor vessel having channels in the outer faces of its opposite sides, and a detachable locking member having studs engaged in said channels, the said channels being downwardly inclined, and the mouthpiece of the minor vessel having forwardly-curved projections in which said channels are formed.

In witness whereof I have hereunto set my hand, this 7th day of May, 1906, in the presence of two subscribing witnesses.

JOHN R. BOSTWICK.

Witnesses:
H. E. BOSTWICK,
Z. H. HANEY.